(No Model.)
P. E. MALMSTRÖM.
APPARATUS FOR CARBONATING AND DISPENSING BEVERAGES.
No. 494,483. Patented Mar. 28, 1893.
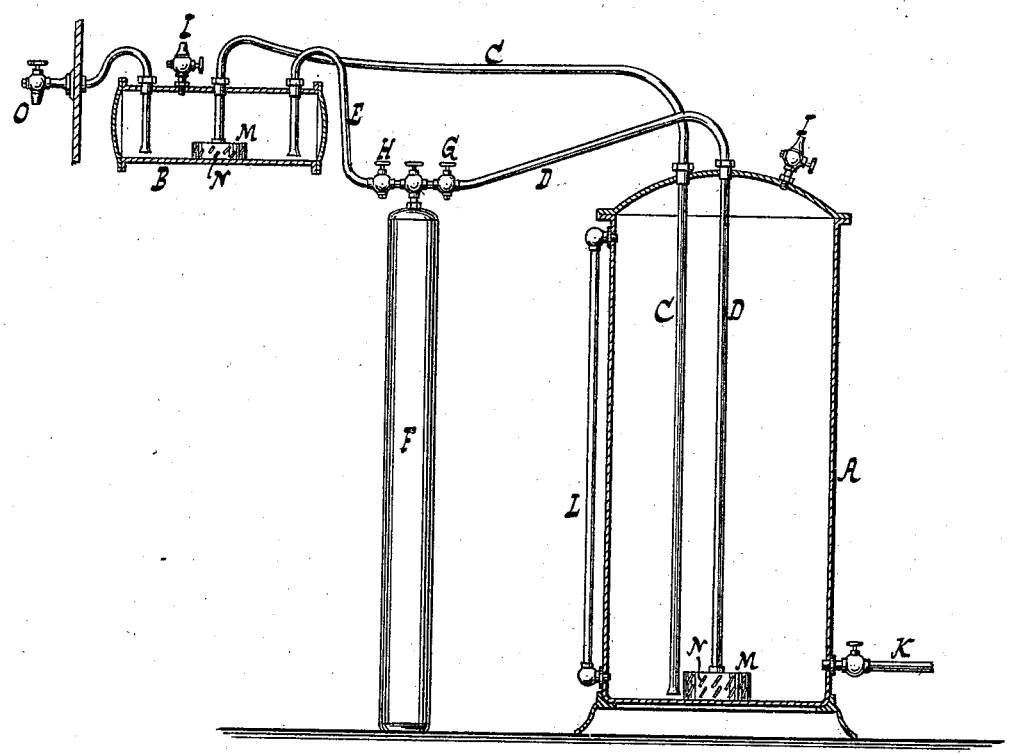
WITNESSES:
INVENTOR:
Peter E. Malmström
BY
Van Santvoord & Hauff
ATTORNEYS.

UNITED STATES PATENT OFFICE.

PETER E. MALMSTRÖM, OF NEW YORK, N. Y.

APPARATUS FOR CARBONATING AND DISPENSING BEVERAGES.

SPECIFICATION forming part of Letters Patent No. 494,483, dated March 28, 1893.

Application filed October 27, 1892. Serial No. 450,152. (No model.)

*To all whom it may concern:*

Be it known that I, PETER E. MALMSTRÖM, a citizen of the United States, residing at New York, in the county and State of New York, have invented new and useful Improvements in Apparatus for Carbonating and Dispensing Beverages, of which the following is a specification.

This invention relates to an apparatus for carbonating and dispensing beverages and the object of the invention is to enable the beverage or liquid to be rapidly and thoroughly carbonated by a simple operation as set forth in the following specification and claims and illustrated in the annexed drawing, which shows a side elevation of the device.

In this drawing the letter A indicates what may be called a primary impregnating vessel and B is a secondary impregnating vessel. A tube or connection C is made to extend from the upper part of each vessel toward the bottom thereof. The tubes or connections D E carry carbonic acid under pressure from the vessel or metallic cylinder F to the vessels A B. Valves G H close or open the tubes or channels D E as required for impregnation.

In manufacturing beverages I proceed as follows: I first open the escape valves I in vessels A B to expel the air in said vessels. Such air can be expelled by carbonic acid from cylinder F. When the air is expelled the valves I are closed, and likewise the valves G H. The primary impregnating vessel is then filled with water or liquid through pipe K which can connect with any suitable force pump or equivalent feeding mechanism to force the water into vessel A against any pressure that may exist therein. A glass tube or water gage L indicates when the vessel A is sufficiently filled or when empty. When the vessel A is supplied with the liquid the valve H is opened to produce a certain pressure of carbonic acid in vessel B. The valve H is then closed and the valve G is opened to produce a pressure in vessel A exceeding that in vessel B. Liquid from vessel A is thus forced from vessel A through tube C into vessel B and on entering the latter said liquid becomes impregnated with the carbonic acid under pressure in vessel B. A circular distributer or deflector such as a box M provided with openings N causes the water to flow circuitously or in jets into the vessel B so as to be thoroughly impregnated. A similar deflector or distributer is provided at the tube D in vessel A to cause the gas from tube D to thoroughly distribute itself in vessel A to impregnate the liquid in the latter. From vessel B the liquid can be drawn or dispensed through tap or valve O.

By having the tube C pass from the top of vessel B downward the liquid will enter vessel B near its bottom so as to be thoroughly agitated and impregnated while at the same time the liquid is prevented from returning from vessel B to vessel A as might occur if the tube C entered directly into the bottom of vessel B. As the pressure in vessel A is at least equal to if not higher than the pressure in vessel B the liquid in the latter is not forced back through the tube C.

What I claim as new, and desire to secure by Letters Patent, is—

1. The herein described method of carbonating beverages or liquids which consists in charging a vessel with carbonic acid under pressure and causing the liquid to flow distributively thereinto from another vessel under increased pressure of carbonic acid through a tube or connection provided with a distributer and made to extend from the upper part of each vessel to near the bottom thereof, said distributer being located within said secondary vessel at the bottom thereof substantially as described.

2. The combination with a primary impregnating vessel and a secondary impregnating vessel of a tube or connection made to extend from the upper part of each vessel toward the bottom thereof a distributer located within and at the bottom of said secondary vessel connected to said tube and charging tubes D E connected to said vessels, substantially as described.

3. The combination with a primary impregnating vessel and a secondary impregnating vessel of a tube or connection made to extend from the upper part of each vessel toward the bottom thereof, a distributer at the bottom of said secondary vessel connected to said tube and charging tubes D E connected to said vessels, said primary impregnating vessel being provided with a force pump or equivalent mechanism for the introduction of liquid, substantially as described.

In testimony whereof I have hereunto set my hand in the presence of two subscribing witnesses.

P. E. MALMSTRÖM.

Witnesses:
 WM. C. HAUFF,
 E. F. KASTENHUBER.